United States Patent [19]

Braden et al.

[11] Patent Number: 5,961,838
[45] Date of Patent: Oct. 5, 1999

[54] AMPHOTERIC POLYMER/POLYAMINE COMBINATIONS FOR COLOR REMOVAL AND CLARIFICATION OF PAPER MILL WASTE WATER

[75] Inventors: Michael L. Braden, Sugar Land, Tex.; Richard E. Metzgar, Pensacola, Fla.; Jitendra T. Shah, Naperville, Ill.

[73] Assignee: Nalco Chemical Company, Naperville, Ill.

[21] Appl. No.: 08/993,229

[22] Filed: Dec. 18, 1997

[51] Int. Cl.⁶ ................. C02F 1/54; B01D 21/01
[52] U.S. Cl. ............ 210/728; 210/734; 210/736; 210/917; 210/928
[58] Field of Search ................. 210/723, 728, 210/732, 733, 734, 735, 736, 917, 928

[56] References Cited

U.S. PATENT DOCUMENTS

| | | |
|---|---|---|
| 4,089,780 | 5/1978 | Svarz et al. ................. 210/917 |
| 4,308,149 | 12/1981 | Selvarajan . |
| 4,374,102 | 2/1983 | Connelly et al. . |
| 4,374,964 | 2/1983 | Phillips et al. . |
| 4,655,934 | 4/1987 | Rose et al. . |
| 4,801,388 | 1/1989 | Fong et al. . |
| 5,120,797 | 6/1992 | Fong et al. . |
| 5,200,089 | 4/1993 | Siefert et al. . |
| 5,283,306 | 2/1994 | Ramesh et al. . |
| 5,292,793 | 3/1994 | Ramesh et al. . |
| 5,314,627 | 5/1994 | Ramesh et al. . |
| 5,338,816 | 8/1994 | Ramesh et al. . |
| 5,413,719 | 5/1995 | Sivakumar et al. ................. 210/917 |
| 5,435,921 | 7/1995 | Collins et al. . |
| 5,435,922 | 7/1995 | Ramesh et al. . |
| 5,552,498 | 9/1996 | Braden . |
| 5,554,298 | 9/1996 | Kochik et al. . |
| 5,601,725 | 2/1997 | Chung et al. . |
| 5,611,934 | 3/1997 | Shepperd, III et al. ................. 210/917 |

FOREIGN PATENT DOCUMENTS 731212  3/1966  Canada .

*Primary Examiner*—Peter A. Hruskoci
*Assistant Examiner*—Betsey J. Morrison
*Attorney, Agent, or Firm*—Margaret M. Brumm; Thomas M. Breininger

[57] ABSTRACT

Processes for removing color from a paper mill waste effluent and for removing color from a textile plant waste effluent utilizing an amphoteric copolymer/polyamine combination are described. A preferred amphoteric copolymer is poly(dimethylaminoethylacrylate methyl chloride quaternary salt/acrylic acid) and a preferred polyamine is a polymeric reaction product of epichlorohydrin and dimethylamine.

4 Claims, No Drawings

AMPHOTERIC POLYMER/POLYAMINE COMBINATIONS FOR COLOR REMOVAL AND CLARIFICATION OF PAPER MILL WASTE WATER

FIELD OF THE INVENTION

Processes for removing color from a paper mill waste effluent and for removing color from a textile plant waste effluent utilizing an amphoteric copolymer/polyamine combination are described. A preferred amphoteric copolymer is poly(dimethylaminoethylacrylate methyl chloride quaternary salt/acrylic acid) and a preferred polyamine is a polymeric reaction product of epichlorohydrin and dimethylamine.

BACKGROUND OF THE INVENTION

Many industrial processes necessitate removal of color before recycling of the water. Particularly, color removal from the effluent streams of paper mills presents a problem within the pulp and paper industry. It is necessary that these waste waters be treated for color removal prior to discharge.

The United States wood pulp production capacity is approximately 60 million tons per year. Since the average cellulose content of wood is about 40%, 150 million tons of wood are needed to produce this 60 million tons of pulp. The difference between these two numbers represents the lignin and hemicellulose which must be removed or separated in the pulping process in order to free the cellulose fibers.

The pulping process, however, does not remove 100% of the lignin present in the wood, with approximately 5% remaining after either Kraft or sulfite pulping (for mechanical pulping the amount is considerably higher). If a high grade paper is the desired end product, then this 5% residual lignin must be removed by bleaching the pulp.

Since over 35% of the pulp produced in the United States is bleached, there are about one million tons of lignin removed each year at the bleach plant, most of this in the caustic extraction stage. This number is significant because in the removal process (i.e., bleaching), most of this residual lignin is solubilized. This solubilized lignin is a strong absorber of visible radiation resulting from the conjugation of unsaturated and quinodal moieties formed during the oxidation step in the bleach plant. Consequently, the bleach plant effluent is highly colored. Although there are other sources of color in paper mill waste effluent, it is readily apparent that where bleaching is performed, its effluent can be expected to be the major contributor of waste color. Indeed, at Kraft bleach mills, the effluent from the first caustic extraction stage accounts for at least 70% of the waste color.

The goal of the pulping and bleaching operation is the removal of lignin and hemicellulose from the cellulose fiber in wood. The 95% that is removed by pulping is often burned as fuel in the process of recovering the inorganic chemicals present in the black liquor. In the bleaching operation, the 5% residual lignin is separated from the fibers by degradation and solubilization and ends up in the waste water. Chemical removal can therefor only be accomplished by reducing this solubility, which has proved to be a difficult task.

Therefore, the primary source of color in pulp is lignin. It has also been suggested that Kraft color is due to keto-enols produced from carbohydrates during the Kraft cook stage in the papermaking process. Chlorination of the pulp during the bleaching operation results in the formation of color bodies which are leached from the pulp by caustic alkali solutions. Thus, the caustic extract effluent contains a major proportion of the color bodies and the other organic materials which have to be disposed of during the waste water treatment.

The process of color removal from the effluent stream is further complicated by the presence of lime, solid particulate matter like pulp, clay, dispersant/surface active materials and polymers used during various stages in the papermaking process. The solid particulate matter is commonly referred to as anionic trash.

Most governmental regulations pertaining to color removal from the effluent stream of a papermaking process are directed to true color, i.e., platinum cobalt (Pt-Co color using a spectrophotometer). Nevertheless, there is increasing pressure on pulp and paper mills to lower the apparent color of the effluent water because that is the color visible to the naked eye. There are occasions when the true color of a system that has undergone treatment is low, but the corresponding apparent color is high. This problem is commonly caused by the presence of suspended particulate matter that causes an increase in the turbidity of the system. Therefore, it is important that any new treatment for color removal should not only remove the true color of the effluent, but should also lower the apparent color as well.

The pressure to remove color comes primarily from state environmental agencies. Previously, it was thought that the discharge of colored waste affected only the aesthetic value of the receiving body of water; however, biologists are becoming increasingly concerned about possible toxic effects, the effect of reduced light transmittance through the water causing reduced levels of photosynthetic activity, and of course, the resultant drop in dissolved oxygen concentration because of this drop in activity. Furthermore, although these colored, waste products are fairly refractory towards biological oxidation and since they become degraded in the aquatic environment, the oxidation products may be potentially harmful.

It has been shown that by-products are water soluble, and that a significant amount is produced. This puts severe demands on chemicals to be used for color removal. There are techniques already available, however, that can remove greater than 90% of the color from either total mill effluent or isolated wastestreams, such as from the caustic extraction stage of the bleach plant. These techniques include chemical (e.g., alum, ferric, lime or polyelectrolytes), biological (e.g., white rot fungus) and physical processes (e.g., ultrafiltration, ion exchange and carbon absorption). However, none of these techniques enjoys widespread use due to prohibitive cost.

Chemical techniques for the removal of color include a decolorizing composition consisting of ferrous sulfate and a water-soluble cationic copolymer of epichlorohydrin and dimethylamine as disclosed in U.S. Pat. No. 5,200,089. A process for color removal from pulp and paper waste waters comprising treating these waters with a coagulant and a vinylamine polymer are disclosed in U.S. Pat. No. 5,435,921. Copolymers comprising diallyldimethyl ammonium chloride and a hydrophobic monomer selected from the group consisting of quaternized dimethylaminoethylacrylates and quaternized dimethylaminoethylmethacrylates are disclosed in U.S. Pat. Nos. 5,338,816; 5,283,306; 5,292,793 and 5,314,627. Solution copolymers of acrylamide and a hydrophobic monomer selected from the group consisting of quaternized dimethylaminoethylacrylates and quaternized dimethylaminoethylmethacrylates for removal of color are disclosed in U.S. Pat. No. 5,292,793. Dispersion polymers formed from the precipitation polymerization of monomers including dimethylaminoethyl(meth)acrylate methyl chloride quaternary salt for color removal are disclosed in U.S. Pat. No. 5,435,922.

The demands on a product used in a color removal application are quite severe, i.e., the product must be capable of reacting with the color bodies in a manner which results in their becoming insoluble and, because of the extremely large amount produced, the color removal product must work at very low weight ratios relative to the organic being removed or its use will be precluded by prohibitive costs.

SUMMARY OF THE INVENTION

Processes for removing color from a paper mill waste effluent and for removing color from a textile plant waste effluent utilizing an amphoteric copolymer/polyamine combination are described. A preferred amphoteric copolymer is poly(dimethylaminoethylacrylate methyl chloride quaternary salt/acrylic acid) and a preferred polyamine is a polymeric reaction product of epichlorohydrin and dimethylamine.

DESCRIPTION OF THE INVENTION

The invention is a process for removing color from a paper mill waste effluent containing color bodies which comprises:

a) treating the waste effluent containing color bodies with an effective color-removing amount of a water-soluble amphoteric copolymer/polyamine combination;

b) coagulating the color bodies present in the waste effluent; and then c) removing the coagulated color bodies from the waste effluent.

The invention is also a process for removing color from a textile plant waste effluent containing color bodies which comprises:

a) treating the waste effluent containing color bodies with an effective color-removing amount of a water-soluble amphoteric copolymer/polyamine combination;

b) coagulating the color bodies present in the waste effluent; and then c) removing the coagulated color bodies from the waste effluent.

The papermill waste effluent may be treated with from about 1 to about 500 parts per million of the combination. Preferably, the papermill waste effluent may be treated with from about 30 to about 200 parts per million of the combination.

The textile plant waste effluent may be treated with from about 1 to about 500 parts per million of the combination. The textile plant waste effluent may be treated with from about 30 to about 200 parts per million of the combination. Most preferably, the textile plant waste effluent may be treated with from about 50 to about 120 parts per million of the combination.

The following information applies to either aspect of this invention. The polyamine may be selected from the group consisting of a polymeric reaction product of ethylene dichloride and ammonia including the associated methyl chloride and dimethyl sulfate quaternary amine salts; a polymeric reaction product of epichlorohydrin and dimethylamine; a polymeric reaction product of epichlorohydrin, dimethylamine and ethylene diamine including the associated methyl chloride or methyl sulfate quaternary amine salts; a polymeric reaction product of epichlorohydrin, dimethylamine and ammonia including the associated methyl chloride or methyl sulfate quaternary amine salts; a polymeric reaction product of epichlorohydrin, dimethylamine hexamethylenediamine including the associated methyl chloride or methyl sulfate quaternary amine salts; guanidine-formaldehyde condensation polymers; cyanoguanidine-formaldehyde condensation polymers; urea-formaldehyde condensation polymers and polyethyleneimines. The amphoteric copolymer may be formed from the polymerization of acrylamide and hydrophobic monomers selected from the group consisting of dimethylaminoethylacrylates having methyl quaternary salts and dimethylaminoethylmethacrylates having methyl quaternary salts. The volume ratio of amphoteric copolymer to polyamine may range from 5:95 to 95:5. Moreover, the volume ratio of amphoteric copolymer to polyamine may range from 5:95 to 50:50. The polyamine may be the polymeric reaction product of epichlorohydrin and dimethylamine and the amphoteric copolymer is poly(dimethylaminoethylacrylate methyl chloride quaternary salt/acrylic acid) in a 50:50 volume ratio.

In addition to the color removal ability in papermaking, it is expected that this polymer combination may also have utility in other manufacturing processes which require color removal, such as within the textile industry.

The polyamine compounds of the invention are preferably chosen from water-soluble or water dispersible polymers which may be formed by step polymerization of materials such as epichlorohydrin-dimethylamine, ethylenedichloride-ammonia, ethylenedichloride-methylamine-ammonia, epichlorohydrin-dimethylamine-ethylene oxidepropylene oxide and aniline-formaldehyde reacted with materials such as epichlorohydrin-dimethylamine polymers, or any other step polymers which contain epichlorohydrin, dimethylamine, ethylenedichloride, ammonia, methylamine, ethylene oxide, propyleneoxide, aniline-formaldehyde condensates, or any admixture of the above ingredients, so as to form a polymer which is water-soluble or water-dispersible.

The polyamine compounds of the invention preferably have an average molecular weight ranging between about 5,000 to about 250,000 daltons. Ethylenedichloride and ammonia react by a series of ammonolysis and alkylation steps to afford a polymer in which the two-carbon unit of ethylene dichloride and the nitrogen atom of ammonia alternate to form chain, branched, or crosslinked structures. Furthermore, the primary, secondary and tertiary nitrogen atoms in such structures may be quaternized by standard methods which are known to those skilled in the art. These polymers are discussed in detail in U.S. Pat. No. 4,374,964, the disclosure of which is incorporated herein by reference.

It is well-known that halohydrins such as epichlorohydrin may react with an amine, with combinations of several different amines, or with combinations of amines and ammonia to produce polyamines containing alternating nitrogen atoms and halohydrin fragments. The reactions leading to polymer formation are all nucleophilic substitutions of the amines or ammonia onto epoxides or chlorohydrins. The polymers are disclosed in detail in U.S. Pat. No. 4,374,102, the disclosure of which is incorporated herein by reference. The preparation of such materials is also discussed in detail in Canadian Patent No. 731,212, the disclosure of which is incorporated herein by reference.

The relative proportions of the polyfinctional amine and polyfunctional halohydrin employed in making the polymers for the purpose of the invention can be varied depending upon the particular types of amine and polyfunctional halohydrin and the reaction conditions. These polymers may also be quatemized using known methods.

Preferred polymers which are useful in the practice of the invention include the polymeric reaction products of the following reactions:
1. Ethylenedichloride and ammonia, including the associated methyl chloride and dimethyl sulfate quaternary amine salts (QUATS);
2. Epichlorohydrin (EPI) and dimethylamine (DMA);
3. Epichlorohydrin, dimethylamine and ethylenediamine, these include the associated methyl chloride or methyl sulfate QUATS;
4. Epichlorohydrin, dimethylamine and ammonia, including the associated methyl chloride or methyl sulfate QUATS;
5. Epichlorohydrin, dimethylamine and hexamethylenediamine, including the associated methyl chloride or methyl sulfate QUATS.

The amphoteric copolymers according to the present invention have been shown to be efficient agents for the removal of color caused by lignins and their derivatives present in the paper mill waste water effluent. It has been discovered that the performance of acrylic acid (AA) can be significantly improved by incorporating a certain degree of hydrophobic nature. Such a modification can be accomplished by copolymerizing AA with hydrophobic monomers, such as quatemized dimethylaminoethylacrylate (DMAEA) or dimethylaminoethylmethacrylate(DMAEM).

The quatemized DMAEA is selected from the group consisting of: dimethylaminoethylacrylate having methyl chloride or bromide quaternaries. It is preferable that the quatemized dimethylaminoethylacrylate be either dimethylaminoethylacrylate methyl chloride quaternary or dimethylaminoethylacrylate methyl bromide quaternary.

Similarly, the quatemized DMAEM is selected from the group consisting of: dimethylaminoethylmethacrylate having methyl chloride or methyl bromide quaternaries.

The synthesis of such polymers is described in U.S. Pat. No. 5,552,498 and 5,554,298, the disclosures of which are hereby incorporated by reference.

The resultant amphoteric polymers are hydrophobic polyelectrolytes which are surface active due to the micellar character of the pendant long chains and the positive charge near the polymer backbone. The examples below demonstrated that these hydrophobic polyelectrolytes exhibit good color removal without overdosage.

The hydrophobic polyelectrolyte copolymer typically has an acrylic acid to hydrophobic monomer molar ratio in the range from 50:50 to 90:10.

The amphoteric polymer and the polyamine may be added to the system to be treated in several different ways. The two can be pre-mixed prior to addition to the system to be treated, added sequentially, or added at the same time via separate feed lines.

The copolymers of this invention may be used alone, or in combination with a high molecular weight anionic, cationic or nonionic water soluble dispersible flocculent. Such polymers include polyacrylamide, poly(DMAEA.MCQ/AcAm) and copolymers of acrylamide with acrylic acid and its water soluble alkali metal or ammonium salts. As used herein, the term acrylic acid is meant to encompass such water soluble salts. Also useful are such polymers as sulfomethylated acrylamides as exemplified in U.S. Pat. Nos. 5,120,797 and 4,801,388, the disclosures of which are hereinafter incorporated by reference into this specification. Other commercially available anionic flocculant materials may also be utilized.

A preferred class of flocculants for use in this invention includes copolymers of DMAEA·MCQ and acrylamide in a mole ratio of 99:1 to 1:99 and preferably 99:1 to 50:50. Most preferably, the mole ratio of acrylamide to DMAEA·MCQ will be 95:5 to 60:40.

The flocculants of this invention may be prepared in solution form, or in water-in-oil emulsion form. The preparation of such flocculants is known to those skilled in the art. The flocculants generally have molecular weights ranging from as low as 1,000,000 to 40,000,000 or higher. Preferred flocculants have a molecular weight of about 10,000,000. The upper weight of molecular weight is not critical so long as the polymer is water soluble or dispersible.

The term color bodies as utilized herein is meant to encompass aldehydes and keto-enol compounds, among others.

The following examples are presented to describe preferred embodiments and utilities of the invention and are not meant to limit the invention unless otherwise stated in the claims appended hereto.

EXAMPLE 1

To determine the effectiveness of the treatment, the polymer(s) to be tested at the desired concentration were added to wastewater from a Southeastern paper mill and mixed at 330 rpm for 1 minute followed by mixing at 80 rpm for 5 minutes. The particles were then allowed to settle for 10 minutes. The supernatant was then collected for analysis of apparent color (AC) and true color (TC). The apparent color was determined by measuring the absorbance of the supernatant at 465 nm using Hach DR-2000 unit. The true color was determined by adjusting the pH of the supernatant to 7.6, filtering it through a 0.8 micron filter and then measuring the absorbance at 465 nm. The unit of measurement for both parameters is Pt-Co. Both the measurements are used at industrial facilities to evaluate the performance of the polymers.

The results in Table I show a dramatic increase over either conventional polymeric treatment alone. For any of the treatments tested, there is a point at which overdosage occurs. Too much treatment agent increases rather than decreases color at some point. The advantage of the combination is that there is a far greater effectiveness is achieved at only 20 ppm, than is achieved at any dosage tested for either polymer dosed alone

TABLE I

| | Color Values | | |
|---|---|---|---|
| Dosage (ppm) | Polymeric Treatment A | Polymeric Treatment B | Polymeric Treatment A + B[1] |
| 0 | 1546 | 1546 | 1546 |
| 10 | 1295 | 1290 | 691 |
| 20 | 1314 | 1295 | 459 |
| 30 | 1332 | 1241 | 497 |
| 40 | 1404 | 1384 | 683 |
| 50 | 1543 | 1479 | 993 |
| 60 | 1673 | 1426 | 1340 |

A = epichlorohydrin/dimethylamine condensation polymer 20,000 MW, available from Nalco Chemical Company of Naperville, IL
B = poly(dimethylaminoethylacrylate methyl chloride quaternary/acrylic acid) 1,000,000 MW, mole ratio of DMAEA.MCQ/AA = 70/30 solution polymer available from Nalco Chemical Company of Naperville, IL
1 = 1:1 mixture changes can be made in the composition, operation and arrangement of the method of the present invention described herein without departing from the concept and scope of the invention as defined in the following claims:

We claim:

1. A process for removing color from a paper mill waste effluent or a textile plant waste effluent containing color bodies which comprises:
   a) treating the waste effluent containing color bodies with an effective color-removing amount of a 1:1 mixture of
      i) a poly(dimethylaminoethylacrylate methyl chloride guatenary/acrylic acid) polymer with a mole ratio of dimethylaminoethylacrylate methyl chloride quaternary to acrylic acid of about 70 to about 30; and
      ii) an epichlorhydrin/dimethylamine condensation polymer;
   b) coagulating the color bodies present in the waste effluent; and then
   c) removing the coagulated color bodies from the waste effluent.

2. The method of claim 1 wherein said waste effluent, is treated with from about 1 to about 500 parts per million of said mixture.

3. The method of claim 1 wherein said waste effluent is treated with from about 30 to about 200 parts per million of said mixture.

4. The method of claim 1 wherein said waste effluent is a textile plant waste effluent that is treated with from about 50 to about 120 parts per million of said mixture.

* * * * *